(No Model.)
W. R. RUSSELL.
COTTON CHOPPER AND SCRAPER.
No. 281,205. Patented July 10, 1883.
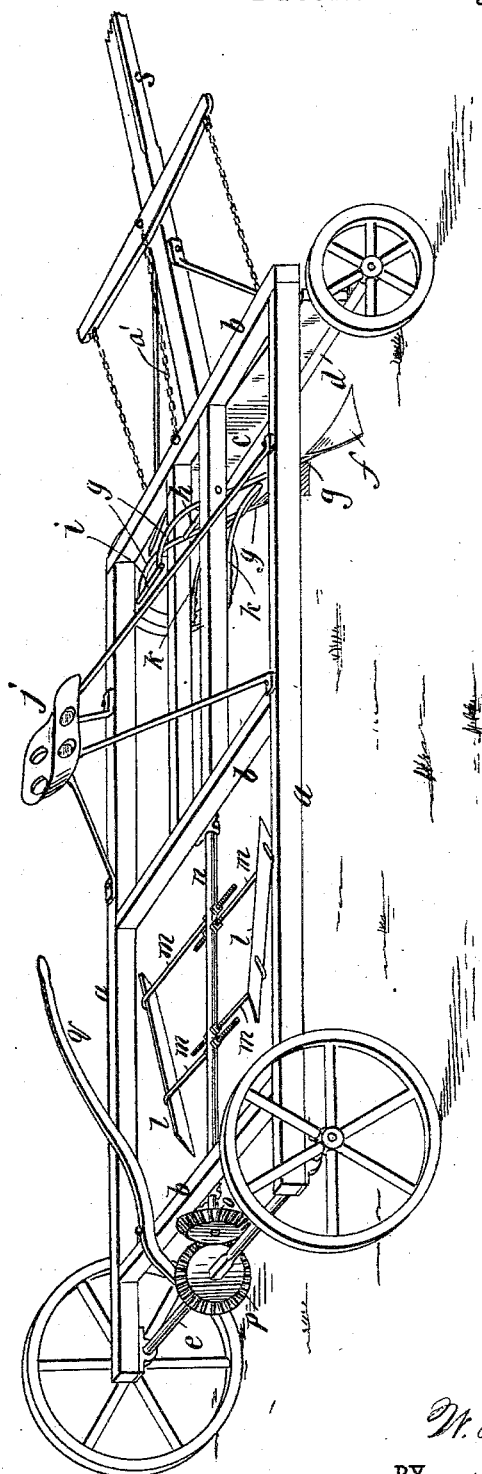
WITNESSES:
INVENTOR:
W. R. Russell
BY Munn & Co
ATTORNEYS.

UNITED STATES PATENT OFFICE.

WILLIAM R. RUSSELL, OF BIG VALLEY, TEXAS.

COTTON CHOPPER AND SCRAPER.

SPECIFICATION forming part of Letters Patent No. 281,205, dated July 10, 1883.

Application filed January 18, 1883. (No model.)

*To all whom it may concern:*

Be it known that I, WILLIAM R. RUSSELL, of Big Valley, in the county of Lampasas and State of Texas, have invented a new and Improved Cotton Chopper and Scraper, of which the following is a full, clear, and exact description.

The object of the invention is to so connect choppers and scrapers with a four-wheeled vehicle that both can readily be operated by the driver, as hereinafter described.

Reference is to be had to the accompanying drawings, forming part of this specification, in which the figure is a perspective view of my improved scraper and chopper.

Near the front end of a truck-frame consisting of side bars, $a$, and cross-bars $b$, and mounted on a four-wheel truck by means of a bolster, $c$, pivoted to the front axle, $d$, and by boxing on the hind axle, $e$, I mount a pair of plows or scrapers, $f$, of the kind usually employed for scraping off the surface each side of the rows of plants, by pivoting the stocks $g$ to the frame at $h$, and extending said stocks upward a suitable distance to enable the rider to swing up the scrapers at any time when it may be required, and holding them above ground for turning the machine around, and for other purposes, by pressing down on the cross-bar $i$ with his feet while sitting on the seat $j$ and driving the team. When the scrapers are down in the working position, the stocks $g$ will bear against suitable stops or brackets, $k$, to maintain them in the working position. In practice these brackets will be made adjustable to regulate the depth of the scrapers in the ground.

The choppers $l$ consist of cutting blades or knives mounted on radial arms $m$ of a shaft, $n$, arranged in the longitudinal axis of the machine behind the driver's seat, and geared with the hind axle by the bevel-wheels $o$ $p$, one of which is made to shift along its shaft by a lever, $q$, for causing the choppers to run or stop, as required. These wheels are to be speeded suitably for running the choppers relatively to the speed of the truck for chopping out as far apart as is required for the length of the hills to be left. The arms $m$, on which the choppers $l$ are mounted, extend through shaft $n$, and are adjustable to project the choppers more or less, as may be required, according to the height of the ridges to be chopped; and the rear ends of the blades are advanced ahead of the front ends circumferentially to cause them to strike the plants first, and thus cause the choppers to shear-cut the plants, and so act with less power, and also with less stress, on the working parts of the machine than if cutting along their whole length at once.

The tongue $s$ may be attached to the front axle by the usual arrangement of hounds, or in any approved way for working the truck, and the front wheels will be made low, while the frame will be mounted high on the bolster for enabling the wheels to swing under the frame for turning short about.

It will be seen that the contrivance is such that one man may easily manage the scrapers and choppers; also, that said scrapers and choppers are adapted to work with less power than when two separate machines are employed; and also that the machine is very simple and cheap, and is well calculated to be durable.

The chain $a'$, connecting the frame $a$ $b$ with the draft attachments, serves to hold the scrapers and choppers well to their work, and in practice I may, at times, set one scraper, $f$, in advance of the other to prevent choking of them by collecting trash.

Having thus described my invention, what I claim as new, and desire to secure by Letters Patent, is—

In a four-wheeled machine for scraping and chopping cotton, the combination of the two scrapers having their standards connected by a cross-bar at the top to form a foot-rest, and pivoted intermediately to the frame, with the rear rotary choppers, $l$ $l$, connected adjustably with the same shaft, and arranged at an oblique angle thereto, as shown and described.

WILLIAM R. RUSSELL.

Witnesses:
M. N. WEATHERLY,
S. D. F. LANE.